United States Patent [19]

Wiegand et al.

[11] Patent Number: 5,444,901
[45] Date of Patent: Aug. 29, 1995

[54] METHOD OF MANUFACTURING SILICON PRESSURE SENSOR HAVING DUAL ELEMENTS SIMULTANEOUSLY MOUNTED

[75] Inventors: Walter J. Wiegand, Glastonbury; Frank W. Gobetz, South Windsor; Robert H. Bullis, Avon; James P. Towey, West Granby; James W. Lennon, West Suffield, all of Conn.

[73] Assignee: United Technologies Corporation, Hartford, Conn.

[21] Appl. No.: 142,237

[22] Filed: Oct. 25, 1993

[51] Int. Cl.6 .......................... H01G 7/00; G01L 9/12
[52] U.S. Cl. ..................... 29/25.42; 29/594; 29/595; 73/718; 361/283.3; 361/283.4
[58] Field of Search ................ 29/25.41, 25.42, 25.35, 29/416, 417, 594, 595; 73/718; 257/417, 418, 419; 361/280, 283.1–283.4

[56] References Cited

U.S. PATENT DOCUMENTS

| | | | |
|---|---|---|---|
| 3,619,742 | 11/1971 | Rud, Jr. | 29/25.42 X |
| 4,390,925 | 6/1983 | Freud | 73/718 X |
| 4,405,970 | 9/1983 | Swindal et al. | 361/283.1 |
| 4,415,948 | 11/1983 | Grantham et al. | 257/417 X |
| 4,420,790 | 12/1983 | Golke et al. | 29/25.42 X |
| 4,425,799 | 1/1984 | Park | 73/718 |
| 4,467,394 | 8/1984 | Grantham et al. | 361/283.4 |
| 4,513,348 | 4/1985 | Grantham | 29/25.41 X |
| 4,517,622 | 5/1985 | Male | 73/718 X |
| 4,530,029 | 7/1985 | Beristain | 73/718 |
| 4,625,561 | 12/1986 | Mikkor | 29/25.41 X |
| 4,701,424 | 10/1987 | Mikkor | 29/25.41 X |
| 4,743,836 | 5/1988 | Grzybowski et al. | 361/280 X |
| 4,879,627 | 11/1989 | Grantham | 361/283.3 |
| 4,883,768 | 11/1989 | Swindal et al. | 257/417 X |
| 4,910,840 | 3/1990 | Sprenkels et al. | 29/594 X |
| 4,951,174 | 8/1990 | Grantham et al. | 73/718 X |
| 4,954,925 | 9/1990 | Bullis et al. | 361/283.1 |

Primary Examiner—Peter Dungba Vo
Attorney, Agent, or Firm—Richard H. Kosakowski; Holland & Associates

[57] ABSTRACT

A dual-element, parallel-plate silicon capacitative pressure sensor includes a pressure sensing element and a reference element of identical structure. Both elements are separately fabricated from the same silicon wafers using identical processing steps. Further, both elements are simultaneously mounted to a header using identical mounting steps. Such identical fabrication and mounting steps serve to identically match the dielectric materials and, thus, the aging properties of both the sensing and reference elements. By matching the sensing and reference elements in these ways, and by aging these components at elevated temperatures in exactly the same way, it is possible to achieve an extremely close match in long-term dielectric aging properties.

17 Claims, 3 Drawing Sheets

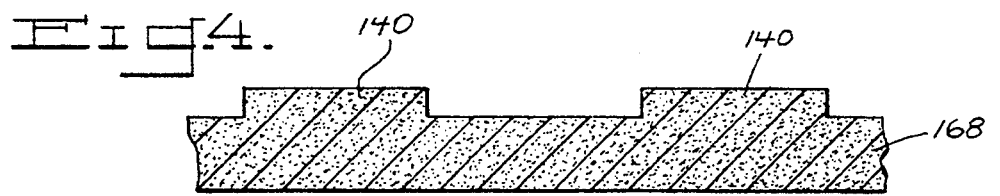
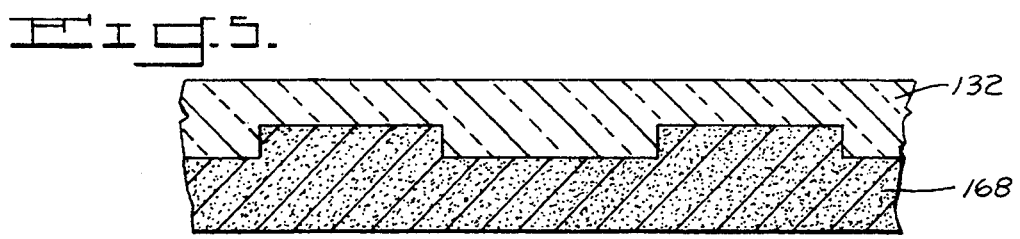
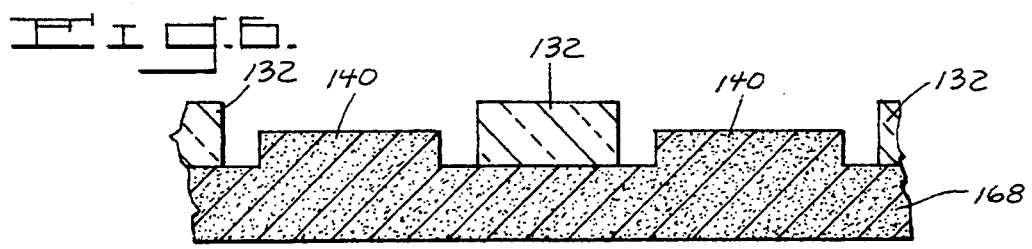
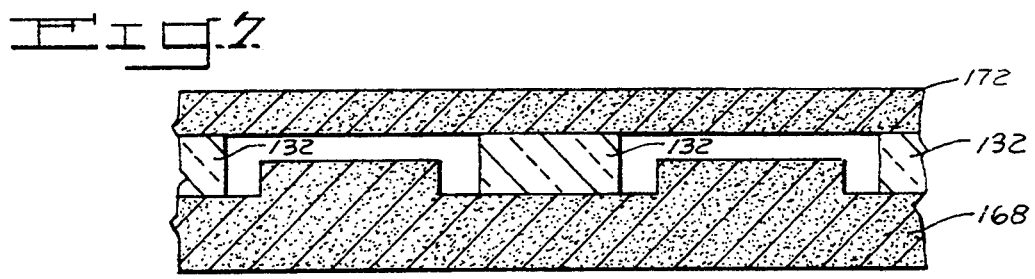
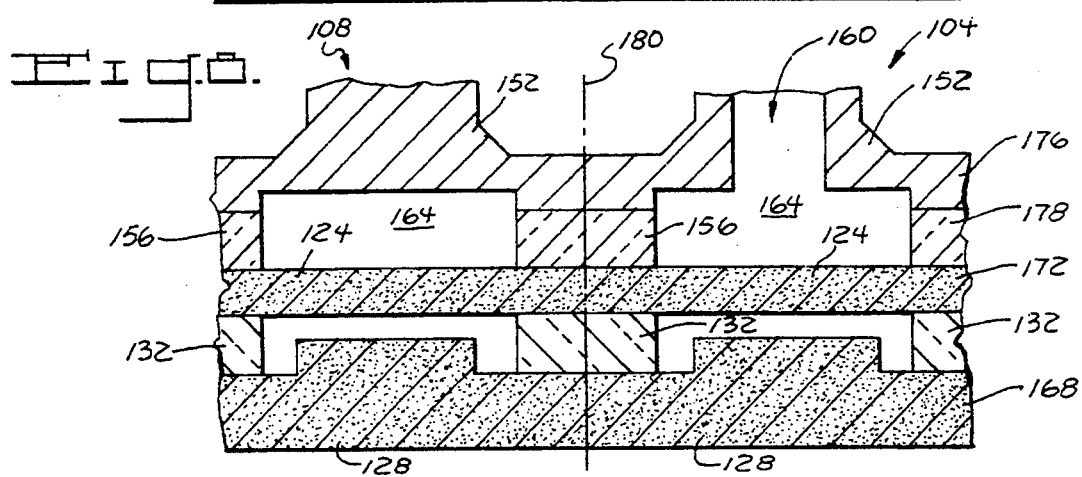

METHOD OF MANUFACTURING SILICON PRESSURE SENSOR HAVING DUAL ELEMENTS SIMULTANEOUSLY MOUNTED

BACKGROUND OF THE INVENTION

This invention relates to pressure sensors, and more particularly, to high accuracy, silicon capacitive pressure sensors utilizing a separate reference element.

In high accuracy (0.05% or 500 ppm) pressure sensing applications, long-term drift (20 years) at high temperatures (120° C.) limits the overall achievable accuracy of a silicon capacitive pressure sensor. This limiting factor may make some sensor designs unsuitable for demanding aerospace applications, such as electronic engine controls ("EECs") and air data computers ("ADCs"). Each component of the sensing element package contributes a small, yet significant, amount to the total error budget of the sensor.

Prior art single element silicon capacitive pressure sensors typically comprise a sensing element made up of a pair of parallel conductive silicon plates, joined together with an insulative borosilicate glass spacer by a field-assisted, vacuum bonding process. This forms an evacuated capsule with opposing conductive surfaces. The opposing silicon pieces form the plates of a pressure variable capacitor. See, for example, U.S. Pat. Nos. 4,415,948, 4,405,970 and 4,530,029. Examples of electronic signal processing circuitry used to process the output signals indicative of sensed pressure from these sensors are described and claimed in U.S. Pat. Nos. 4,743,836 and 4,517,622.

One conductive silicon plate of the capacitive pressure sensor forms a diaphragm that flexes inwardly in the presence of fluid pressure applied to the outside surface of the diaphragm that is greater in magnitude than the pressure (usually vacuum) between the plates. The second conductive silicon plate forms a substrate that is normally held rigid. The deflection of the diaphragm causes a variation in the distance between the plates, thus varying the capacitance of the plates. Thus, pressure variations are transduced to capacitance variations in a typical silicon capacitive pressure sensor. The borosilicate glass serves not only to separate the plates but also to seal the vacuum enclosure therebetween. The diaphragm and substrate are normally doped to make them electrically conductive.

These pressure sensing devices are particularly well suited for miniaturization due to the fine dimensional control achievable using the semiconductor and thin film technologies. They are also well suited to the measurement of small differential pressures in various commercial and aerospace applications. Microcircuit technology can produce a large number of pressure sensors fabricated from a silicon wafer.

In any silicon capacitive pressure sensor, parasitic capacitance is a limitation on the accuracy of the sensor because it can result in an overall long-term drift. Parasitic capacitance is the inherent capacitance of the non-pressure sensitive interstices of the sensor structure. For example, the parasitic capacitance provided by the borosilicate glass spacer may comprise upwards of fifty percent (50%) of the total capacitance of the sensing element. Such parasitic capacitance reduces the gain of the pressure dependent capacitive sensor because it adds in parallel to the pressure-sensitive capacitance of the sensor. This reduces the dynamic range of the sensor and reduces its sensitivity to pressure changes. Also, the aging or drift in the electrical properties of the dielectric wall spacer has been identified as the major contributing factor to the drift of the sensing element. Thus, a large effort has been placed in the past on reducing such capacitance through variations in the design of the sensor architecture.

However, parasitic capacitance is inherent in any physical structure and there is a minimum practically achievable value that may still be unacceptable in high sensitivity sensing applications. The aforementioned U.S. Pat. No. 4,405,970 discloses a method of reducing the parasitic capacitance in a silicon capacitive pressure sensor by providing specific borosilicate glass structures that separate fixed portions of the two capacitive plates at a relatively long distance from each other. Another approach to reducing the parasitic capacitance is disclosed in U.S. Pat. No. 4,467,394, in which a three plate device is utilized that, when combined with appropriate signal processing circuitry, eliminates the parasitic capacitance from the measurement and, thus, eliminates the resulting overall drift and instability of the sensor. A further approach to eliminating the parasitic capacitance is disclosed in U.S. Pat. No. 4,951,174.

It has been discovered experimentally that the aging of the deposited borosilicate glass dielectric spacer (which electrically isolates the diaphragm of the sensor from the base or substrate) is the primary contributor to sensing element drift and, thus, long-term stability of the sensor. This differs from the performance of many other types of capacitive pressure sensors, such as metal diaphragm devices, in which the physical creep or movement of the diaphragm and base significantly contributes to sensor drift. In an attempt to solve this problem, it is known to provide a silicon capacitive pressure sensor having a reference capacitor comprised of an "off-the-shelf" capacitor. The intent is to try to match the dielectric materials of the reference and sensing elements together. However, this approach does not provide the requisite high degree of matching of aging properties of the sensing and reference elements needed for high accuracy aerospace applications. Thus, heretofore, there has clearly been a lack of appreciation of the high degree to which this matching must be achieved and the performance improvement derived therefrom.

Accordingly, it is a primary object to the present invention to achieve long-term (20 years) performance stability of a silicon capacitive pressure sensor by structurally matching to high precision the sensing and reference elements of the sensor, especially over the entire dynamic operating envelope of the sensor.

It is a general object of the present invention to provide a silicon capacitive pressure sensor with separate sensing and reference elements that have their aging effects identically matched by fabricating both elements from the same wafer and exposing them to identical processing and mounting steps.

It is another object of the present invention to provide a silicon capacitive pressure sensor having high accuracy, high reliability, small size, light weight, low temperature sensitivity, high dynamic range, excellent long term stability and operability in rugged environments.

The above and other objects and advantages of this invention will become more readily apparent when the following description is read in conjunction with the accompanying drawings.

SUMMARY OF THE INVENTION

To overcome the deficiencies of the prior art and to achieve the objects listed above, the Applicants have invented an improved silicon capacitive pressure sensor having separate yet identical sensing and reference elements that are fabricated using identical processing and mounting steps.

In the preferred embodiment of the present invention, a parallel plate silicon capacitive pressure sensor includes a pressure sensing element and a reference element of identical structure to the sensing element and preferably fabricated from the same wafer as the sensing element and using identical processing and mounting steps. Such identical fabrication steps serve to identically match the dielectric materials and, thus, the aging properties of both the sensing and reference elements. Further, the steps involved in mounting the reference and sensing elements to the package are identically applied to each element. This prevents undesirable stress in the elements and also matches the transient thermal response in both elements. Both elements are exposed to all of the same processing steps and have identical thermal histories. Use of a reference element together with a sensing element, and use of a ratiometric measurement scheme, makes it possible to cancel dielectric aging effects, which are the only factors contributing to long-term, sensing element drift. By considering the sensing element and the reference element as matched components, and by aging these components at elevated temperatures in exactly the same way, it is possible to achieve an extremely close match in long-term dielectric aging properties.

BRIEF DESCRIPTION OF THE DRAWINGS

FIGS. 4-8 are cross sectional views illustrating the various steps in the sequential fabrication of the elements of FIGS. 2 and 3.

DETAILED DESCRIPTION OF THE PREFERRED EMBODIMENTS

Figure 1:
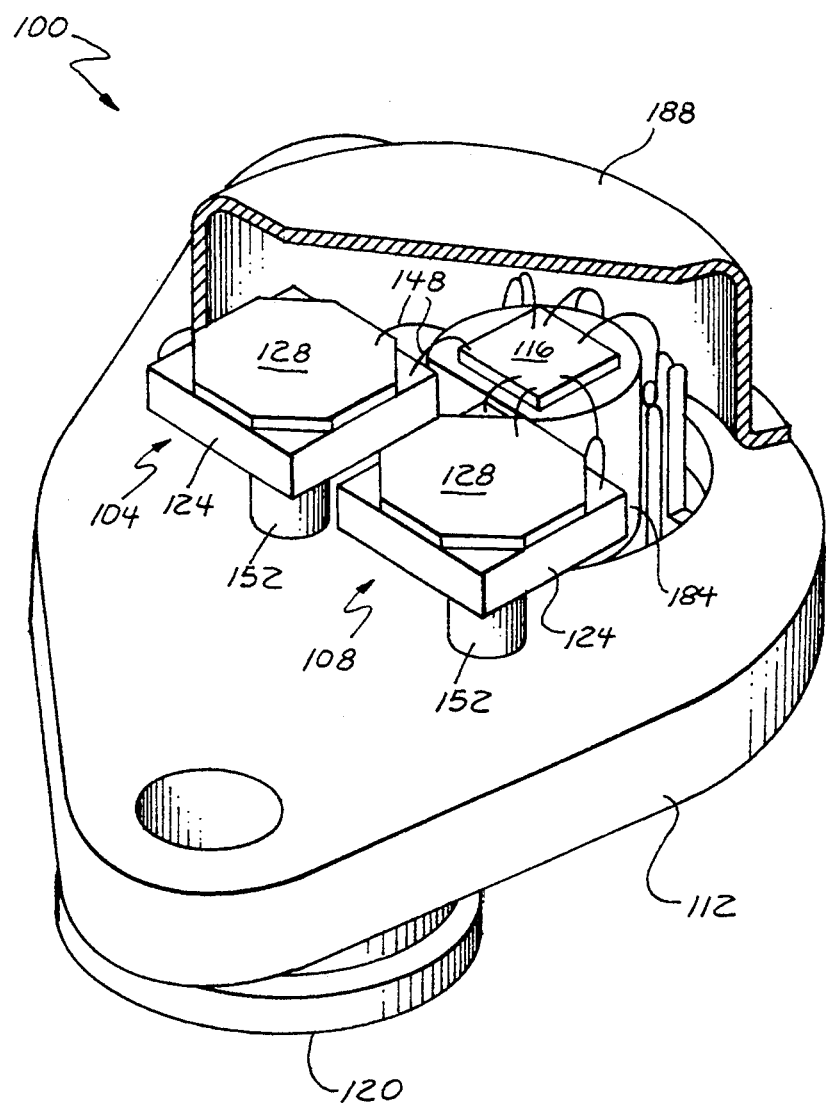
FIG. 1 is a perspective view, partially cut away, of the silicon capacitive pressure sensor of the present invention having separate sensing and reference elements.

Referring to the drawings in detail, an exemplary embodiment of a dual element, parallel-plate, silicon capacitive pressure sensor according to the present invention is shown and generally designated by the reference numeral 100. The sensor 100 comprises a silicon pressure sensing element 104, together with a reference element 108. Both elements 104, 108 are mounted on a header 112, and encapsulated in a standard package, for example, a T03 package. Electronic signal processing circuitry 116 is also included within the package. The circuitry 116 provides one or more signals indicative of the sensed pressure applied to the sensing element 104. The fluid whose pressure is to be sensed is applied to the sensing element 104 through a pressure port 120 on the opposite side of the header 112. Both the sensing element 104 and the reference element 108 have identical structures, except that the reference element 108 does not have a port 120 for applying fluid pressure thereto. Further, both the sensing element 104 and the reference element 108 are fabricated and mounted using identical methodologies.

Figure 2:
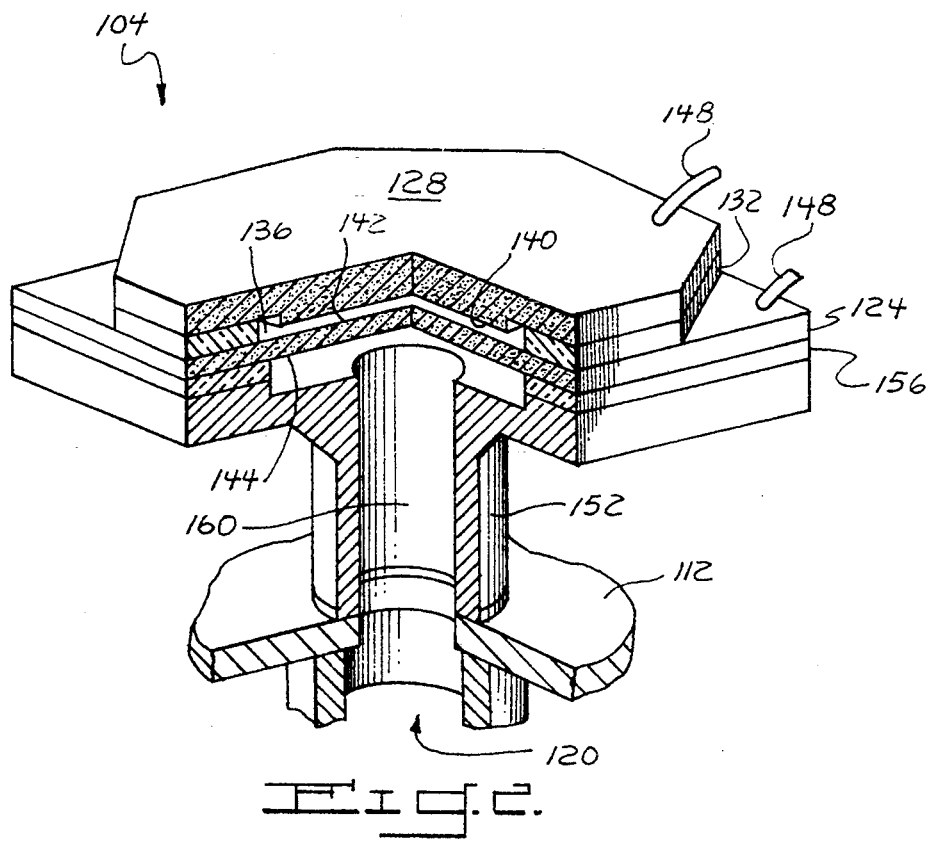
FIG. 2 is a perspective view, partially cut away to reveal a cross-sectional view of the sensing element of FIG. 1.

Referring now to FIG. 2, there illustrated is a perspective view, partially cut away to expose in cross sectional form, the silicon pressure sensing element 104. The sensing element 104 may be similar to that described in the following U.S. Patents, all assigned to the assignee of the present invention, and all hereby incorporated by reference: U.S. Pat. Nos. 4,879,627; 4,883,768; 4,951,174; 4,954,925; 4,513,348; 4,415,948; 4,405,970. The sensing element 104 comprises a silicon diaphragm 124 and a silicon base or substrate 128, separated by a dielectric wall spacer 132. The spacer 132 is typically made of borosilicate glass, and may comprise, for example, the commercially available Model 7070 glass supplied by Corning. Thus, the sensing element 104 comprises a silicon-glass-silicon ("SGS") sandwich that is typically square in its exterior configuration, but often may by circular or cylindrical in shape for its inner, operative substructure.

The diaphragm 124 comprises a square sheet or plate of appropriately doped silicon, which is somewhat flexible. The substrate 128 also comprises an appropriately doped sheet of silicon. The dielectric spacer 132 disposed between the diaphragm 124 and substrate 128 creates a closed, evacuated, hermetically sealed, chamber 136 between the two parallel silicon layers 124, 128. The chamber 136 is typically at a zero vacuum value, or, if desired, it can be sealed at higher reference pressure. The pressure value within the chamber 136 depends upon the desired pressure value that the sensing element 104 is designed to measure small variations or differential values therearound. The chamber 136 thus provides a reference pressure on one side of the flexible diaphragm 124.

A centrally located, typically circular mesa 140 is formed on a surface of the substrate 128. The mesa 140 extends into the generally cylindrical chamber 136. The mesa 140 serves as a counter-electrode to the deformable diaphragm 124. A thin insulating layer glass (not shown) may cover the top of the mesa 140.

In the exemplary embodiment of FIG. 2, the spacing between an under surface 142 of the silicon diaphragm 124 and the top of the mesa 140 is approximately 2.5 microns, while the thickness of the borosilicate glass spacer 132 is typically 9 microns. For an exemplary sensing element 104 designed to sense variations in absolute pressure of 50 lbs. per square inch (50 psi), the silicon diaphragm 124 is approximately eight thousandths (0.008") of an inch thick, while the substrate 128 is approximately fifty thousandths (0.050") of an inch thick.

As the pressure applied to an outside surface 144 of the silicon diaphragm 124 varies, the diaphragm 124 flexes toward the substrate 128. This causes the spacing between the diaphragm 124 and the substrate 128 to change. Since the diaphragm 124 and the substrate 128 serve as the plates of a parallel plate capacitor, the flexing of the diaphragm 124 increases the capacitance of the sensing element 104. The change in capacitance as a result of the change in the pressure applied to the surface of diaphragm 124 is used as a measure of the pressure applied to the sensing element 104.

A pair of electrical conductors or wires 148 are connected to the silicon diaphragm 124 and substrate 128 for connection to an external signal processing circuit 116 (FIG. 1). The circuit 116 measures the changing capacitance of the sensing element 104 as a function of the applied pressure. The varying pressure on the exterior, sensing surface 144 of the flexible silicon diaphragm 124 causes the diaphragm 124 to flex. Such flexing changes the value of the intersticial capacitance 124 between the diaphragm and the substrate 128, which transduces the applied pressure into a measurable electronic signal. As noted hereinabove, there is an approximately 2.5 micron spacing between the under surface 142 of the diaphragm 124 and the top of the mesa 140 when the sensor is at its zero or reference pressure. Such spacing allows room for the diaphragm 124 to flex toward the mesa 140 as the pressure applied to the exterior surface 144 of the diaphragm 124 is increased.

The wall of the borosilicate glass spacers 132 typically has a horizontal thickness of, e.g., thirty six thousandths (0.036") of an inch. The mesa 140 extends up from the main surface of the silicon substrate 128 to a dimension of approximately 6.5 microns. The diameter of the mesa 140 may be one hundred fifty thousandths (0.150") of an inch.

As illustrated in FIG. 2, the silicon diaphragm 124 may typically be square, while the silicon substrate 128 may have an octagonal shape. Such shape provides access for attachment of the electrical wires 148 to the silicon diaphragm 124. In the exemplary embodiment of FIG. 2, the silicon substrate 128 has a side length of two hundred sixty thousandths (0.260") of an inch, while the borosilicate glass spacer 132 wall has an inner diameter of one hundred ninety thousandths (0.190") of an inch. The outer side surface of the wall spacer 132 can either follow the basic square configuration above the silicon diaphragm 124, or it may have a circular configuration.

A transition piece 152, comprised of appropriately doped silicon, is bonded through a borosilicate glass spacer 156 to the exterior surface 144 of the silicon diaphragm 124. The glass spacer 156 bonded to the transition piece 152 may also comprise the Model 7070 glass provided by Corning. The transition piece 152 includes a pressure port 160, which comprises a throughbore, through which the fluid whose pressure is to be sensed is communicated to the exterior surface 144 of the diaphragm 124. The transition piece 152 tapers down to a pedestal shape for mounting to the surface of the header 112, in accordance with the present invention. The pedestal shape of the transition piece 152 accommodates the temperature coefficient mismatch between silicon and the header material. The transition piece 152 has a thickness of approximately one hundred twenty-five thousandths (0.125") of an inch.

Figure 3:
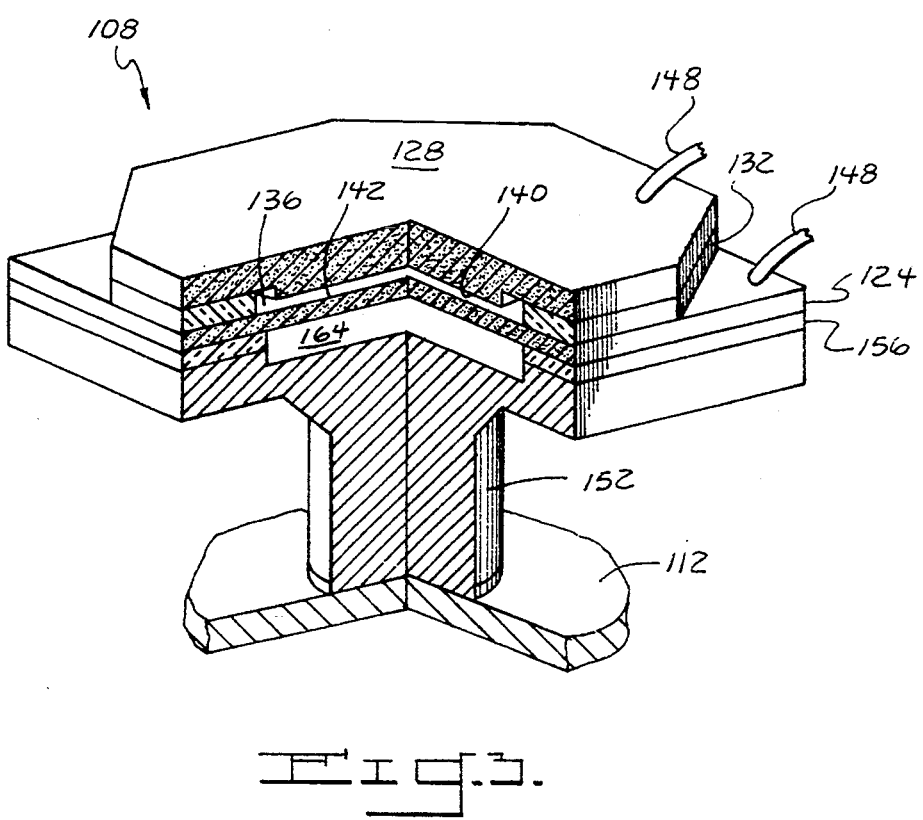
FIG. 3 is a perspective view, partially cut away to reveal a cross-sectional view of the reference element of FIG. 1.

Referring now to FIG. 3, there illustrated is the reference element 108 of the sensor 100 of FIG. 1. The reference element 108 is identical in all respects to the sensing element 104 of FIG. 2, with the exception that no throughbore 160 is provided in the reference element 108. This is because no external pressure is applied to the diaphragm 124 of the reference element 108. An evacuated chamber 164 is formed bounded by the diaphragm 124 transition piece 152 and glass spacer 156 therebetween.

In accordance with the present invention, the reference and sensing elements 104, 108 are fabricated from the same components and mounted onto the header 112 (FIG. 1) using identical steps. That aspect of the present invention dealing with the mounting of the sensing and reference elements 104, 108 is described and claimed in a copending U.S. Patent Application, filed on even date herewith and assigned to the same assignee as the present invention, entitled "REFERENCE ELEMENT FOR HIGH ACCURACY SILICON CAPACITIVE PRESSURE SENSOR" Ser. No. 08/142,236. The output of each element 104, 108 is fed over the corresponding conductors 148 to the signal processing circuitry 116, which may be that described in the aforementioned U.S. Pat. Nos. 4,743,836 and 4,517,622, both of these patents being hereby incorporated by reference. The circuitry 116 may be operable to take the ratiometric output of the two elements 104, 108. That is, the capacitance of the sensing element 104 is compared to the capacitance of the reference element 108, and the difference is indicative of the pressure applied to the sensing element 104. Any aging of the components of both elements 104, 108, in particular the dielectric spacers 132, 156, is cancelled by the circuitry 116. This is because the aging affects both elements 104, 108 equally.

Referring now to FIGS. 4–8, in accordance with the present invention, both the sensing and reference elements 104, 108 are fabricated from the same silicon wafers using identical processing steps. In addition, both elements 104, 108 are mounted to the header 112 using identical mounting steps. Since the structure of each element 104, 108 is identical (with the exception of the pressure port 160 provided solely for the sensing element 104), the fabrication steps that follow are to be understood to apply equally to both elements 104, 108.

The starting point in the fabrication process is a commercially-available silicon wafer 168 that comprises the substrate 128 of both the sensing and reference elements 104, 108. To make the wafer electrically conductive, the wafer 168 is appropriately doped with, for example, antimony. However, the silicon wafer 168 may either be doped with N or P type impurities having at least a doping concentration of $10^{15}$ impurity per cubic centimeter to achieve less than one ohmcentimeter resistivity.

Using well-known masking, photoresist, and etching techniques, the silicon wafer 168 is etched away at predetermined locations to create a plurality of mesas 140, each mesa being approximately 6.5 microns in height.

Next, referring to FIG. 5, the borosilicate glass that will serve as the dielectric spacer 132 is deposited onto the silicon wafer 128. The glass may be sputtered onto the wafer 128 using well-known vacuum deposition techniques to a thickness of approximately 9 microns. The deposited glass serves three purposes: as a dielectric spacer 132 forming an enclosed vacuum cavity between the conductive substrate 128 and conductive diaphragm 124; as a means of forming a precise gap between the diaphragm 124 and substrate 128; and as an agent for bonding the silicon substrate 128 and diaphragm 124 to the spacer 132.

The type of glass used as the spacer 132 is important. In the exemplary embodiment of the present invention, the glass comprises the Model 7070 borosilicate glass provided by Corning. This glass has the same thermal properties (e.g., thermal expansion coefficients) as the silicon wafer 168. Also, this glass has lithium and potassium ions that are available to assist in the bonding of the diaphragm to the glass, as described in greater detail hereinafter.

Next, the silicon substrate wafer 168 with the glass 132 formed thereon may be subject to thermal processing, such as annealing, to reduce any stresses. The borosilicate glass layer 132 is then appropriately etched or patterned (FIG. 6) using well-known photolithographic and etching techniques, to form the glass spacer 132 only around the approximate perimeter of that portion of the silicon wafer that will form the resulting sensing or reference elements 104, 108.

After the base wafer 168 has been prepared in the aforementioned steps, a second silicon wafer 172 may be prepared, by suitable lapping to a desired thickness, such as on the order of 200 microns, to form the flexible diaphragm (FIG. 7). The silicon wafer 172 that forms the diaphragm 124 may be appropriately doped with the desired impurities. This silicon diaphragm layer 172 is then bonded to the dielectric glass that forms the spacer 132 between the diaphragm 172 and the silicon substrate layer using known electrostatic bonding techniques. For example, the diaphragm layer 172 may be bonded using the known field assisted sealing technique of joining glass to semiconductors. This technique involves subjecting the diaphragm layer 172 to temperatures of approximately 300°-500° C. to induce ionic mobility within the borosilicate glass utilized. The aforementioned Model 7070 glass from Corning has lithium and potassium ions available at high temperature which may be used in this electrostatic bonding technique. After being heated and reaching a high degree of conductivity, the glass spacer-diaphragm junction is subjected to an electric potential on the order of 100 volts DC. This produces a depletion layer at the interface between the silicon and the glass. If the electric potential is properly directed, the positive lithium and potassium ions drift away from the interface and a high field is created across this interface, causing intimate contact between the glass spacer 132 and the silicon diaphragm layer 172. In this manner, a hermetic seal between the silicon and glass is formed. This above-described process is normally accomplished in vacuum in order to provide an absolute pressure sensor.

Both the silicon substrate layer 168 and silicon diaphragm layer 172 may have thin metallization layers deposited locally thereon, for example, in the form of a 500 angstrom thick layer of nickel, followed by a second layer of about 5000 angstroms of gold. This provides a suitable surface for wire bonding of the electrical wires 148 to both the diaphragm 124 and the substrate 128.

Next, another layer 176 of appropriately doped silicon is provided. This silicon layer 176 has the transition pieces 152 for both the sensing elements 104 and reference elements 108 formed therein. More particularly, the layer 176 has the desired transition pieces 152 formed at appropriate locations in the layer 176 by forming the pedestal shapes in what will be both sensing elements 104 and reference elements 108, and by forming the throughbores 160 in only the sensing elements 104. The pedestal shapes and throughbores 160 are etched in the silicon layer 176 using known EDM techniques. The transition piece layer 176 may be on the order of one hundred twenty-five thousandths (0.125") of an inch thick.

The transition piece silicon layer 176 then has a layer 178 of dielectric glass deposited thereon. The glass may comprise the Model 7070 borosilicate glass from Corning. The glass layer 178 may be deposited in a similar manner as the aforementioned glass spacer 132. The second glass layer 178 is photolithographically patterned and etched into a ring only around the perimeter of the transition piece layer 172 so as to form the glass dielectric spacers 156 and chambers 164.

The resulting glass layer 178 and silicon layer 176 wafer is then bonded to the silicon diaphragm layer 172 using similar electrostatic bonding techniques described earlier. The glass layer 178 contacts the diaphragm layer 172, as illustrated in FIG. 8.

Once the aforementioned steps illustrated in FIGS. 4–8 have taken place, the resulting silicon and glass multilayered component is diced appropriately, such as by sawing, to provide a plurality of individual piece parts, as indicated by the dashed lines 180. Up until now, all of the aforementioned steps were done at the wafer level. Also, the silicon substrate 128 may, if desired, be cut into an octagon shape to expose the electrical connection points on the silicon diaphragm 124.

In accordance with the mounting aspect of the present invention, a selected sensing element 104 and a selected reference element 108 fabricated from the same silicon wafers 168, 172, 176 using the same processing steps as hereinbefore described are now mounted to the header 112 using identical mounting steps. The header 112 may be fabricated from the material sold under the trademark KOVAR ®, or other similar alloys. The header 112 has a throughbore that acts as the pressure port 120 through which the fluid whose pressure is desired to be measured by the sensing element 104 is applied thereto. The selected sensing element 104 is placed over the pressure port 120 such that its transition piece 152 is in contact with the header 112. Also, the selected reference element 108 is disposed on the surface of the header 112 adjacent to the sensing element 104. Both the sensing and reference elements 104, 108 are chosen from the individual piece parts fabricated from the same silicon wafer 168 forming the substrate 128, the same silicon wafer 172 forming the diaphragm 124, and the same silicon wafer 176 forming the transition piece 152.

Prior to placement of the sensing and reference elements 104, 108 on the header 112, the capacitance values of each element may be checked for their degree of matching. Next, the chosen sensing and reference elements 104, 108 are simultaneously bonded to the header 112 using an eutectic bonding process. This process involves coating with gold the outer surface of the silicon transition piece 152 that is to contact the header 112, and then heating the device at an elevated temperature to bond both the sensing and reference elements 104, 108 simultaneously to the header 112. Next, the electrical circuit 116 is mounted onto a pedestal 184 using a similar eutectic bonding, but is done at a lower temperature than the aforementioned bonding of the elements 104, 108 to the header 112. However, since both elements 104, 108 have already been bonded to the header 112, both elements 104, 108 see this low temperature eutectic bonding of the circuit 116 onto its pedestal 184. Finally, a cap 188 which covers the two elements 104, 108 and the electrical circuit 116 is capacitively welded to the header 112. Again, both elements 104, 108 see this process, therefore, they are both equally effected thereby.

The present invention has been described for use with a silicon capacitative pressure sensor 100 having identical sensing and reference elements 104, 108 fabricated with a specific structure. However, it is to be understood that the structure of both the sensing and reference elements 104, 108 is exemplary. Any other structure comprising the sensing and reference elements 104, 108, along with the processing steps used in fabricating such elements, may be used without departing from the spirit of the present invention. It suffices for one aspect of the present invention that both the sensing and reference elements 104, 108 be fabricated having identical structures and using identical processing steps. Further, it suffices for a second aspect of the present invention that both elements be mounted onto a header 112 using identical mounting steps.

It should be understood by those skilled in the art that structural modifications can be made without departing from the spirit of the invention. Accordingly, reference should be made primarily to the accompanying claims, rather than the foregoing specification, to determine the scope of the invention.

Having thus described the invention, what is claimed is:

1. A method of fabricating a dual-element, silicon capacitive pressure sensor that provides an electrical signal indicative of a capacitance that varies in a corresponding amount to the variance in the pressure of a fluid applied to a sensing surface of the sensor, comprising the steps of:
   a. fabricating a sensing element comprising a conductive silicon sensing substrate and a conductive silicon sensing diaphragm arranged in parallel and separated by a first dielectric spacer to form an enclosed sensing chamber therebetween;
   b. fabricating a reference element comprising a conductive silicon reference substrate and a conductive silicon reference diaphragm arranged in parallel and separated by a second dielectric spacer to form an enclosed reference chamber therebetween, the conductive silicon reference substrate being fabricated from the same silicon wafer as the conductive silicon sensing substrate, the conductive silicon reference diaphragm being fabricated from the same silicon wafer as the conductive silicon reference diaphragm; and
   c. mounting simultaneously the sensing element and reference element to a header.

2. The method of claim 1, wherein the step of mounting simultaneously the sensing element and reference element to the header includes the step of eutectically bonding the sensing element and reference element to the header.

3. The method of claim 1, after the step of mounting the sensing element and reference element simultaneously to the header, further including the step of mounting an electrical circuit to the header, the electrical circuit being responsive to the capacitance of both the sensing element and the reference element.

4. The method of claim 3, further including the step of mounting a protective covering over the sensing element, the reference element and the electrical circuit.

5. The method of claim 1, further including the step of mounting a protective covering over both the sensing element and the reference element.

6. The method of claim 1, wherein the step of fabricating a sensing element including the steps of:
   a. forming a throughbore in a conductive silicon transition element, the transition element being operable to pass the fluid whose pressure is desired to be measured to a first surface of the conductive silicon sensing diaphragm, the first surface of the conductive silicon sensing diaphragm comprising the sensing surface of the sensor;
   b. depositing a dielectric wall on a surface of the transition element; and
   c. bonding the dielectric wall to a surface of the sensing diaphragm.

7. The method of claim 1, wherein the step of fabricating a reference element includes the steps of:
   a. depositing a dielectric wall on a surface of a conductive silicon transition element; and
   b. bonding the dielectric wall to a surface of the reference diaphragm.

8. The method of claim 1, before the step of mounting the sensing element and the reference element simultaneously to the header, further including the step of mounting an electrical circuit to the header, the electrical circuit being responsive to the capacitance of both the sensing element and the reference element.

9. The method of claim 8, further including the step of mounting a protective covering over the sensing element, the reference element and the electrical circuit.

10. A method of fabricating a silicon capacitive pressure sensor that senses the pressure of a fluid applied thereto and transduces this pressure value to a proportional capacitance value, which sensor includes:
   a. a header;
   b. a sensing element having a conductive silicon sensing substrate and a conductive silicon sensing diaphragm separated by a first dielectric spacer, and having a conductive silicon sensing transition element separated from the sensing diaphragm by a second dielectric spacer, wherein the sensing substrate and sensing diaphragm are arranged to form the parallel plates of a sensing capacitor; and
   c. a reference element having a conductive silicon reference substrate formed from the same silicon wafer as the conductive silicon sensing substrate, having a conductive silicon reference diaphragm formed from the same silicon wafer as the conductive silicon reference diaphragm, the reference substrate and the reference diaphragm being separated by a third dielectric spacer, the reference element also having a conductive silicon reference transition element formed from the same silicon wafer as the conductive silicon sensing transition element, the reference transition element being separated from the reference diaphragm by a fourth dielectric spacer, wherein the reference substrate and the reference diaphragm are arranged to form the parallel plates of a reference capacitor; the method comprising the steps of:
   a. mounting the sensing element to the header; and
   b. mounting the reference element to the header, wherein the steps of mounting the sensing element and reference element to the header are performed simultaneously.

11. The method of claim 10, wherein the step of mounting the sensing element to the header includes the step of eutectically bonding the sensing element to the header.

12. The method of claim 10, wherein the step of mounting the reference element to the header includes the step of eutectically bonding the reference element to the header.

13. The method of claim 10, after the steps of mounting the sensing element and reference element to the header, further including the step of mounting an electrical circuit to the header, the electrical circuit being responsive to the capacitance of both the sensing element and reference element.

14. The method of claim 10, before the steps of mounting the sensing element and reference element to the header, further including the step of mounting an electrical circuit to the header, the electrical circuit being responsive to the capacitance of both the sensing element and the reference element.

15. The method of claim 10, further including the step of mounting a protected covering over both the sensing element and the reference element.

16. A method of fabricating a silicon capacitive pressure sensor having a sensing element and a reference element, the sensing element being operable to sense the pressure of a fluid applied thereto and to transduce this fluid pressure to a corresponding electrical capacitance value, the reference element being operable to provide a reference electrical capacitance value, the method comprising the steps of:

a. fabricating a sensing element having an electrically-conductive sensing substrate and an electrically-conductive sensing diaphragm separated by a first dielectric spacer;

b. fabricating a reference element having an electrically-conductive reference substrate and an electrically-conductive reference diaphragm separated by a second dielectric spacer, the sensing element being physically separate from the reference element;

c. mounting the sensing element to a header; and d. mounting the reference element to the header, wherein the steps of mounting the sensing element and reference element to the header are performed simultaneously.

17. The method of claim 16, wherein the steps of mounting the sensing element and reference element to the header include the step of eutectically bonding the sensing element and reference element to the header.

* * * * *